(12) United States Patent
Reynolds et al.

(10) Patent No.: US 8,358,859 B2
(45) Date of Patent: *Jan. 22, 2013

(54) SYSTEM AND METHOD FOR DYNAMICALLY SWITCHING QUALITY SETTINGS OF A CODEC TO MAINTAIN A TARGET DATA RATE

(75) Inventors: Jodie L. Reynolds, Folsom, CA (US); Lawrence S. Reznick, Sacramento, CA (US); John E. Wilkinson, Carmichael, CA (US); Jack A. Prock, Folsom, CA (US); Danny L. Mabey, Farmington, UT (US)

(73) Assignee: Interact Devices, Inc., Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,798

(22) Filed: May 4, 2012

(65) Prior Publication Data

US 2012/0219058 A1 Aug. 30, 2012

Related U.S. Application Data

(63) Continuation of application No. 11/945,131, filed on Nov. 26, 2007, now Pat. No. 8,175,395, which is a continuation of application No. 10/784,397, filed on Feb. 23, 2004, now Pat. No. 7,302,102, which is a continuation-in-part of application No. 10/692,106, filed on Oct. 23, 2003, now Pat. No. 7,599,434, and a continuation-in-part of application No. 10/256,866, filed on Sep. 26, 2002, now Pat. No. 7,295,608.

(60) Provisional application No. 60/325,483, filed on Sep. 26, 2001.

(51) Int. Cl.
*G06K 9/36* (2006.01)

(52) U.S. Cl. ..................................................... 382/232

(58) Field of Classification Search .......... 382/232–236, 382/238–240, 175, 395; 348/417.1, 418.1, 348/422.1; 375/240.04, 240.12, 240.24
See application file for complete search history.

(56) References Cited

U.S. PATENT DOCUMENTS

| 7,295,608 | B2 * | 11/2007 | Reynolds et al. | ......... 375/240.01 |
| 7,302,102 | B2 * | 11/2007 | Reynolds et al. | ............. 382/232 |
| 7,599,434 | B2 * | 10/2009 | Reynolds et al. | ........ 375/240.01 |
| 8,175,395 | B2 * | 5/2012 | Reynolds et al. | ............. 382/232 |

* cited by examiner

*Primary Examiner* — Jose Couso
(74) *Attorney, Agent, or Firm* — Kory D. Christensen; Stoel Rives LLP (57) ABSTRACT

A video compression system includes a compression module to compress each of a plurality of segments of an input signal using an initial quality setting. A rate calculation module calculates, for each compressed segment, a data rate for an output signal that would result from adding a compressed segment to the output signal. A selection module automatically selects, in response to the calculated data rate deviating from a target range, a quality setting for each segment that results in a data rate this is within the target range when a segment compressed using the automatically-selected quality setting is added to the output signal.

10 Claims, 9 Drawing Sheets

SYSTEM AND METHOD FOR DYNAMICALLY SWITCHING QUALITY SETTINGS OF A CODEC TO MAINTAIN A TARGET DATA RATE

CROSS-REFERENCE TO RELATED APPLICATIONS

This application is a continuation of U.S. patent application Ser. No. 11/945,131, filed Nov. 26, 2007, now U.S. Pat. No. 8,175,393, issued May 8, 2012, which is continuation of U.S. patent application Ser. No. 10/784,397, filed Feb. 23, 2004, now U.S. Pat. No. 7,302,102, issued Nov. 27, 2007, which is a continuation-in-part of U.S. patent application Ser. No. 10/256,866, filed Sep. 26, 2002, now U.S. Pat. No. 7,295,608, issued Nov. 13, 2007, and a continuation-in-part of U.S. patent application Ser. No. 10/692,106, filed Oct. 23, 2003, now U.S. Pat. No. 7,599,434, issued Oct. 6, 2009, both of which claim the benefit of Provisional Application No. 60/325,483, filed Sep. 26, 2001. All of the foregoing applications are incorporated herein by reference.

TECHNICAL FIELD

The present invention relates generally to the field of data compression. More specifically, the present invention relates to techniques for optimizing the compression of video and audio signals.

BACKGROUND OF THE INVENTION

Communication bandwidth is becoming an increasingly valuable commodity. Media signals, including video and audio signals, may consume enormous amounts of bandwidth depending on the desired transmission quality. Data compression is therefore playing a correspondingly important role in communication.

Generally, the sending party selects a codec (compressor/decompressor) for compressing and decompressing media signals. A wide variety of codecs are available. General classifications of codecs include discrete cosine transfer (DCT) codecs, fractal codecs, and wavelet codecs.

The sending party will also typically decide on various codec settings that will apply throughout the communication session. Because the codec settings affect the "quality" of the transmission, i.e., how similar a received and decompressed signal is to the original, such settings are often referred to as quality settings.

In general, quality settings affect the amount of bandwidth required for the transmission. Higher quality settings typically consume greater bandwidth, while lower quality settings require lesser bandwidth.

Unfortunately, the bandwidth required for sending each frame of a media signal is variable, as is the overall amount of available bandwidth. Using a single set of quality settings throughout a transmission does not take into account this variability, and the result is video "jerkiness" (frame loss), audio degradation, and the like, when there is insufficient bandwidth to represent a frame at a given moment in time. Anyone who has participated in a videoconferencing session has experienced the uneven quality of conventional approaches.

DETAILED DESCRIPTION

The present invention solves the foregoing problems and disadvantages by providing a system and method for dynamically switching quality settings of a codec to maintain a target rate during video communication.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

Figure 1:
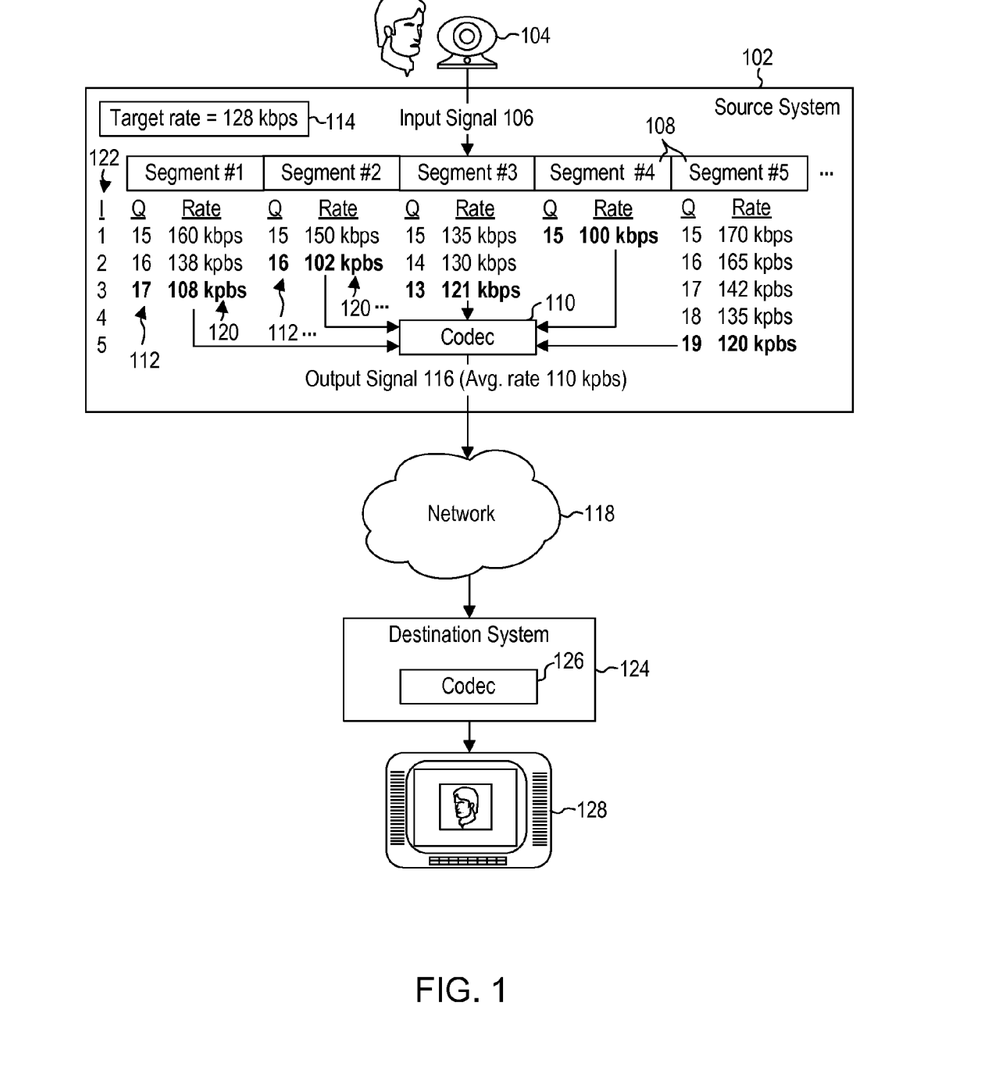
FIG. 1 is a block diagram of a video communication system according to an embodiment of the invention.

FIG. 1 is a block diagram of a video communication system according to an embodiment of the invention. A source system 102 may include a camera 104 or other device for capturing an input signal 106. The camera 104 may be a conventional digital video camera, such as a Logitech Quickcam™ or the like. In various embodiments, the source system 102 may be embodied as a personal computer, videophone, dedicated video conferencing system, or other system or device for enabling video communication.

As illustrated, the input signal 106 is divided into a plurality of segments 108. In one embodiment, a segment 108 includes one or more "frames" of the input signal 106. A frame is generally defined as a single image in a series of images. The NTSC standard provides for 30 interlaced video frames per second. A segment 108 may also represent time divisions of the input signal 106, e.g., one second of video. In alternative embodiments, the segments 108 may vary in length. For instance, a segment 108 may correspond to a scene, which may be of arbitrary duration.

Conventionally, a standard codec 110 would compress all of the segments 108 using a single, pre-selected set of quality settings 112. Quality settings 112 vary from codec to codec. Examples of various quality settings 112 for one codec 110 are provided hereafter in Table 1.

Unfortunately, the standard approach of using the same quality settings 112 throughout a communication session has many disadvantages. For example, if the bandwidth needed to compress a given segment 108 is higher than the available bandwidth, various problems, such as video jerkiness (frame loss), audio degradation, and the like, may result.

To avoid these problems, the source system 102 establishes a target rate 114 for an output signal 116 that is less than or equal to the maximum data rate for a network 118 or device that is to receive the signal 116. In one embodiment, the target rate 114 is specified by the user, typically from a menu of allowable values. For instance, in the depicted embodiment, the user selected a target rate 114 of 128 kbps (kilobits per second).

In an alternative embodiment, the target rate 114 may be automatically selected by the source system 102 based on the known or calculated capacity of the network 118 or receiving device. For instance, a DSL network may have a maximum throughput of 512 kbps, in which case the system 102 may automatically select a target rate 114 that is less than 512 kbps.

After the target rate 114 has been established, the source system 102 uses the codec 110 to test various quality settings 112 on each segment 108 to find a quality setting 112 that does not result in an output signal 116 which exceeds the target rate 114 when a segment 108 compressed using the quality setting 112 is added to the output signal 116.

Table 1 sets forth a few of the possible quality settings 112 that may be tested. Manipulating certain settings 112, however, has little effect on the data rate of the output signal 116. Three settings that do have a noticeable impact on data rate include the quality quantizer (Q), the frame size, and the frame rate.

TABLE 1

| Setting | Range | Effect |
|---|---|---|
| HQ | On/Off | Force a macroblock decision method to increase quality. |
| 4MV | On/Off | Use four motion vectors per macroblock to increase quality. |
| QPEL | On/Off | Use quarter picture element motion compensation methods to increase quality. |
| GMC | On/Off | Use global movement compensation to increase quality. |
| NAQ | On/Off | Normalize adaptive quantization to average quality over all macroblocks. |
| ME | n | Select motion estimation method, each algorithm with varying quality production. |
| Bit Rate | n | Bandwidth setting. Quality varies with this. |
| Bit Rate Tolerance | n | Variance from the average bit rate setting. Quality varies with this as it allows bandwidth changes. |
| Frame Rate | n | Video frames per second (fps). Movie rates are ~24 fps, TV are ~30 fps. Less reduces quality. |
| Frame Size | width, height | Video frame size. Reduce from the original size and still hold the entire frame requires fewer picture elements and so reduces quality. |
| Aspect Ratio | n | Select video width-to-height ratio: square, 4:3 NTSC (525 lines), 4:3 PAL (625 lines), 16:9 NTSC, 16:9 PAL, extended. Fitting to destination display requirements. Wrong fit reduces quality. |
| GOP | n | Group of pictures. Frequency of the I frame containing full-frame data in the frame count. Smaller numbers increase the data size. Bigger numbers increase the compression. |
| Sample Rate | n | Audio samples per second. Greater quantities increase the data size. |
| Q | 1 ... 31 | Quality quantizer to force a specific overall quality level. Smaller numbers tend to increase the data size. Bigger numbers increase the compression. |
| Q Compress | 0.0 ... 1.0 | Quantizer change allowed between scenes. More reduces quality. |
| Q Blur | 0.0 ... 1.0 | Quantizer smoothing allowed over time. More reduces quality. |
| Q Min | 1 ... Q | Minimum quality quantizer level allowed. Wide variance from Q reduces quality. |
| Q Max | Q ... 31 | Maximum quality quantizer level allowed. Wide variance from Q reduces quality. |
| Q Diff | 1 ... 31 | Maximum quality quantizer level difference allowed between frames. Wide variance reduces quality. |
| MPEG Quant | On/Off | Off = H.263 quantizer. On = MPEG quantizer. On increases quality. |
| RC Q Squish | On/Off | Rate control limiting Q within Q Min and Q Max. Varies quality by clipping or producing continuous limiting. |
| RC Max Rate | n | Rate control maximum bit rate. |
| RC Min Rate | n | Rate control minimum bit rate. |
| Luma Elim Threshold | n | Limiting threshold on luminence component. |
| Chroma Elim Threshold | n | Limiting threshold on chrominance components. |
| I Quant Factor | n | Quality quantizer level difference between I and P frames. Greater difference reduces quality. |
| I Quant Offset | n | Quality quantizer to determine which P frame's quantizer or whether rate control changes the quality difference between I frames and P frames. Greater values reduce quality. |
| Aspect Ratio Custom | width, height | Special width and height settings used when Aspect Ratio is set to "extended." Wrong fit reduces quality. |

TABLE 1-continued

| Setting | Range | Effect |
|---|---|---|
| DCT Algorithm | 0 . . . n | Several algorithms available to determine the form of discrete cosine transform. |
| PTS | n | Presentation time stamp in microseconds controlling when codec must complete. Too soon related to frame rate reduces quality. |
| Luminance Masking | n | Varies quality when enabled. |
| Temporal Complexity Masking | n | Varies quality when enabled. |
| Spatial Complexity Masking | n | Varies quality when enabled. |
| P Masking | n | Varies quality when enabled. |
| Darkness Masking | n | Varies quality when enabled. |
| IDCT Algorithm | 0 . . . n | Several algorithms available to determine the form of discrete cosine transform. |

As shown in FIG. 1, the system 102 may automatically test different quality quantizers (Q), which define, for certain codecs 110, stair step functions that reduce the number of bits used to encode video coefficients. The system 102 may begin with an initial quality setting 112 (e.g., Q=15) and calculate the data rate 120 (e.g., 160 kbps) that would result from compressing segment #1 using that quality setting 112.

If the calculated rate 120 is higher than the target rate 114, the system 102 automatically selects a new quality setting 112 that results in a lower calculated rate 120 for the output signal 116. In the example of FIG. 1, higher Q settings 112 typically result in lower calculated rates 120. In this context, "automatically selected" means that the quality setting 112 is selected without human intervention. It is known in the art for video engineers to manipulate quality settings 112 of a video signal. However, such manipulation requires considerable skill, is time-intensive, and cannot be done in real time.

While the following description often refers to quality setting 112 in the singular, it should be recognized that the system 102 may test multiple quality settings 112 in order to select the best combination. Hence, reference herein to "quality setting" should be construed to mean "one or more quality settings."

Various techniques for automatically selecting a quality setting 112 are described below. However, in the depicted embodiment, the source system 102 may automatically select the next higher or lower quality setting 112, depending on how changes to that setting 112 affect the calculated rate 120. For instance, increasing the quality quantizer by a step typically results in a lower calculated rate 120. Increasing other quality settings 112 may produce the opposite result.

The system 102 may go through a number of iterations 122 of testing before finding a quality setting 112 that produces a calculated rate 120 that is less than or equal to the target rate 114. For instance, in the case of segment #1, three iterations 122 are required, while five iterations are needed for segment #5. In some cases, as with segment #4, the initially selected quality setting 122 already results in a calculated data rate 120 that is less than or equal to the target rate 114.

Once a quality setting 112 is found that results in a compressed segment 108 that does not cause the output signal 116 to exceed the target rate 114, the system 102 adds the compressed segment 108 to the output signal 116. Thus, each segment 108 may be potentially compressed using different quality settings 112, unlike conventional approaches which rely on a single set of quality settings 112 for the entire communication session.

The output signal 116 is then sent to a destination system 124, in one embodiment, through the network 118. The network 118 may be a local area network (LAN), the Internet, or another suitable communication network. Like the source system 102, the destination system 124 may be embodied as a personal computer, videophone, dedicated video conferencing system, or the like.

Within the destination system 124, a similar or identical codec 126 decompresses the signal 116 received from the source system 102 using conventional techniques. Typically, the output signal 116 need not include special indicators of the selected quality settings 112 for each segment 108. Most codecs 110 are able to dynamically detect setting changes using the output signal 116 as a reference. The resulting decompressed signal may then be displayed on a display device 128, such as a television, computer monitor, or the like.

Assuming that a segment 108 comprises one frame of NTSC video, the source system 102 may have, for example, approximately 30 milliseconds to automatically select a quality setting 112. Given a sufficiently powerful source system 102, the above-described process of testing and automatically selecting a quality setting 112 for each segment 108 may be accomplished in real time.

Advantageously, because the selected quality setting 112 is tailored to the target rate 114, there is little chance that the bandwidth required to send a particular segment 108 will exceed the available bandwidth (assuming that the chosen target rate 114 provides a sufficient cushion for network problems). Hence, the difficulties of frame loss and audio degradation of conventional systems are reduced or substantially eliminated.

Figure 2:
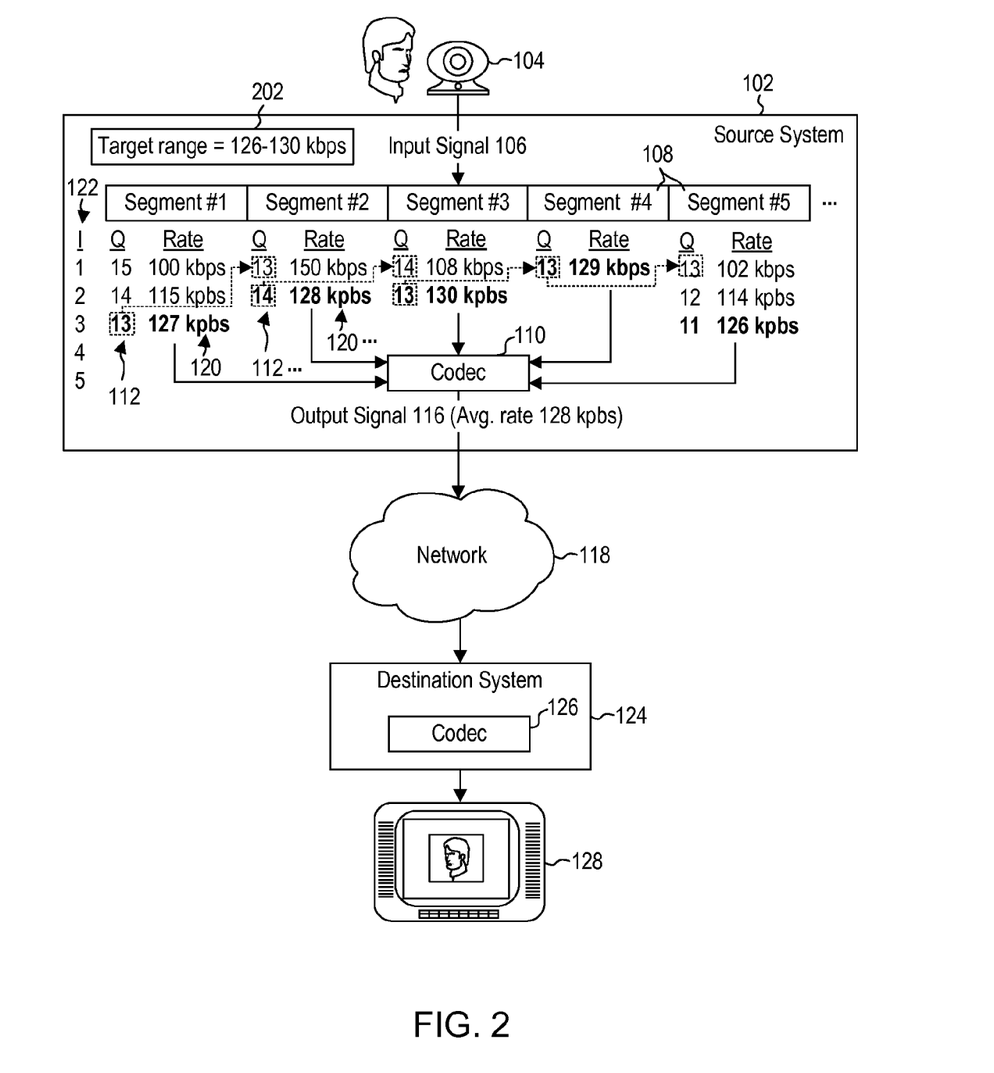
FIG. 2 is a block diagram of an alternative embodiment of a video communication system.

FIG. 2 illustrates an alternative video communication system that provides more precise control over the data rate of the output signal 116. In the system of FIG. 1, the initially-selected quality setting 112 may already result in a data rate for the output signal 116 that is significantly lower than the target rate 114. Also, the system of FIG. 1 only reduces the calculated rate 120 for a segment 108 until it is less than or equal to the target rate 114. Thus, the resulting output signal 116 will typically have an average data rate that is lower than the target rate 114 (e.g., 110 kbps in FIG. 1). Because the data rate impacts video quality, the output signal 116 may be of lower quality than it could have been had it been closer to the target rate 114.

Accordingly, in one embodiment, rather than always starting with the same initial quality setting 112 for each segment 108, the system 102 will begin with the automatically-selected quality setting 112 for the previous segment 108. This is based on the fact that adjacent segments 108 will often have very similar characteristics. Hence, the automatically-selected quality setting 112 for one segment 108 will likely be applicable to the following segment 108. The exception to the above would be the initial quality setting 112 for the first segment 108, which could be arbitrarily selected or predefined.

As further illustrated in FIG. 2, the system 102 may establish a target range 202 rather than a target rate 114. The target range 202 is a range of acceptable data rates for the output signal 116. In one configuration, the target range 202 could be defined as a target rate 114 with an allowable threshold distance, e.g., +/−2 kbps.

As before, if the calculated rate 120 is higher than the target range 202 (as with segment #2), the system 102 automatically selects a new quality setting 112 that reduces the calculated rate 120 for the output signal 116. However, if the calculated data rate 120 for the initially-tested quality setting 112 is already lower than the target range (as with segment #1), the system 102 will automatically select a new quality setting 112 that increases the calculated data rate 120. In the illustrated embodiment, this may be accomplished by reducing the quantizer (Q) quality setting 112. Other quality settings 112 may require different adjustments.

The system 102 may continue to test new quality settings 112 through multiple iterations 122 until it identifies a setting 112 that produces a calculated data rate 120 for the output signal 116 that is within the target range 202. In one embodiment, if no quality setting 112 (or combination of settings 112) will produce a calculated data rate 120 within the target range 202, then the system 102 may select the quality setting 112 that produces the calculated data rate 120 that is closest to (and/or lower than) the target range 202.

Additionally, in order to compress the input signal 106 in real time, a time limit may be established for testing quality settings 112 on each segment 108. Therefore, if the time limit runs out before the ideal quality setting 112 is found, the most recently tested quality setting 112 may be automatically selected.

The net result of the above-described techniques is to more quickly arrive at the correct quality settings 112 for each segment 108, while maintaining the data rate that is as close as possible to the target range 202. In the example of FIG. 1, the average data rate for the output signal 116 was 110 kbps, as opposed to an average output data rate of 128 kbps for FIG. 2. Thus, the quality level of the output signal 116 in FIG. 2 is likely to be better.

As previously noted, the present invention is not limited to manipulating a single quality setting 112 of a codec 110 for each segment 108. In various embodiments, the system 102 may test different combinations of quality settings 112 to find the ideal combination. The main limiting factor is the need to complete the testing within a specified period of time in order to facilitate real-time compression. This may not be the case in every embodiment, however, and greater time may be spent in creating an output signal 116 that is precisely tailored to a particular target rate 114 or range 202. For instance, where the output signal 116 is to be stored on media, e.g., a DVD, greater care may be taken to achieve the optimal settings 112.

Figure 3:
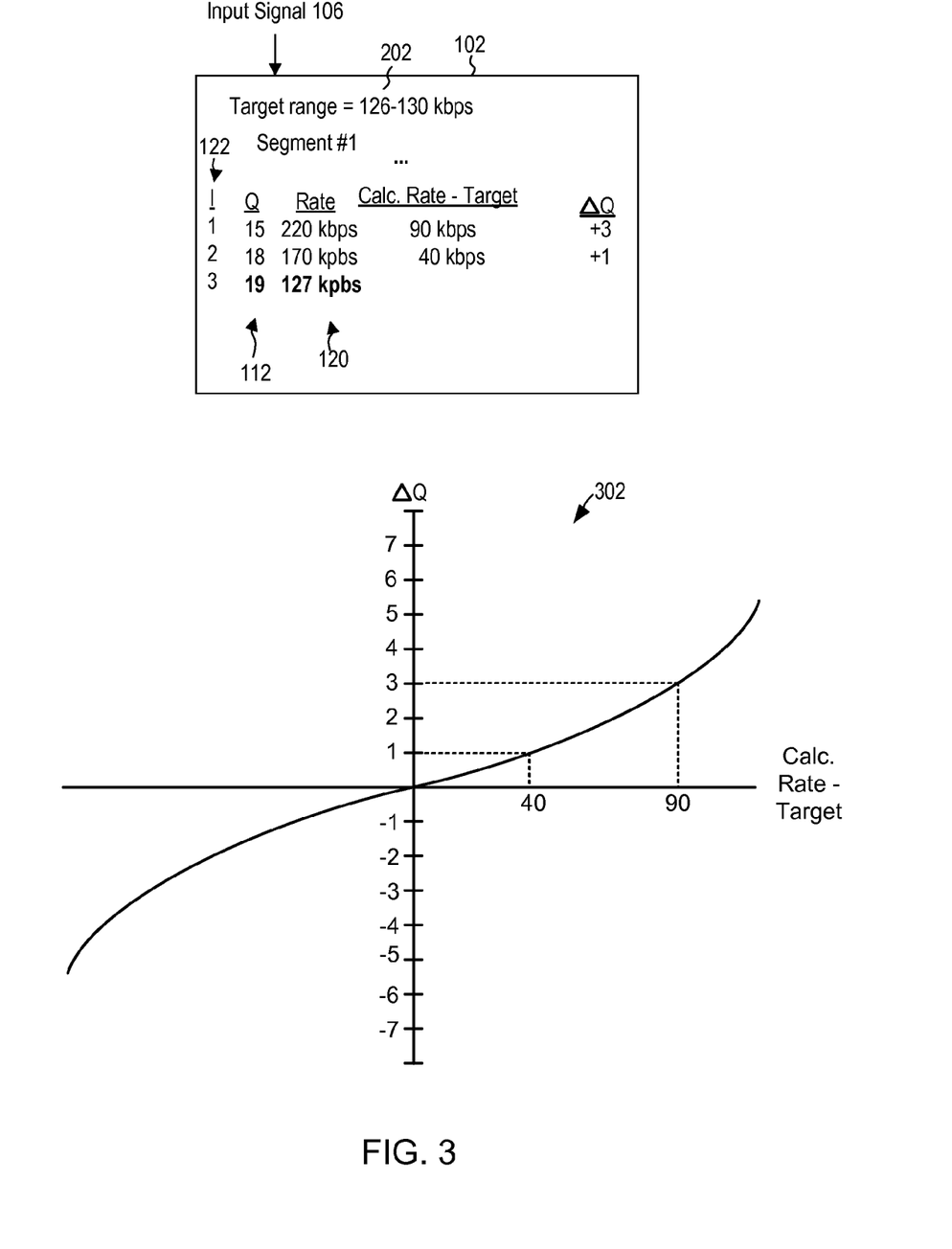
FIG. 3 is a graph of a selection function.

FIG. 3 illustrates an alternative process for automatically selecting a quality setting 112. As described above, the source system 102 may initially test a pre-selected quality setting 112. However, subsequently-selected quality settings 112 may be a function of the distance between the calculated data rate 120 and the target range 202 (or rate 114). This helps the source system 102 to minimize the number of iterations 122 required to find the optimal quality setting 112.

In one embodiment, the source system 102 determines the difference between the calculated data rate 120 and the target range 202 (or rate 114). That difference is applied to a selection function 302 that returns the change in the quality setting 112 (e.g., $\Delta$ Q) or the new quality setting 112 itself. The selection function 302 is typically a non-linear function that may be derived from experimental data and will vary depending on the particular quality setting 112 and codec 110 in question.

In the example of FIG. 3, the first iteration 122 results in a difference between the calculated rate 120 and the target range 202 of 90 kbps. Applying the selection function 302, the quantizer quality setting 112 is to be increased by three steps. In the subsequent iteration 122, the difference is only 40 kbps, resulting in an increase of one step for the quantizer quality setting 112. Those of skill in the art will recognize that the this approach saves two iterations 112 in the present example when compared to the linear approach of FIGS. 1 and 2. In still other embodiments, a binary search pattern or other algorithms may be employed to minimize the number of iterations 122 for each segment 108.

Figure 4:
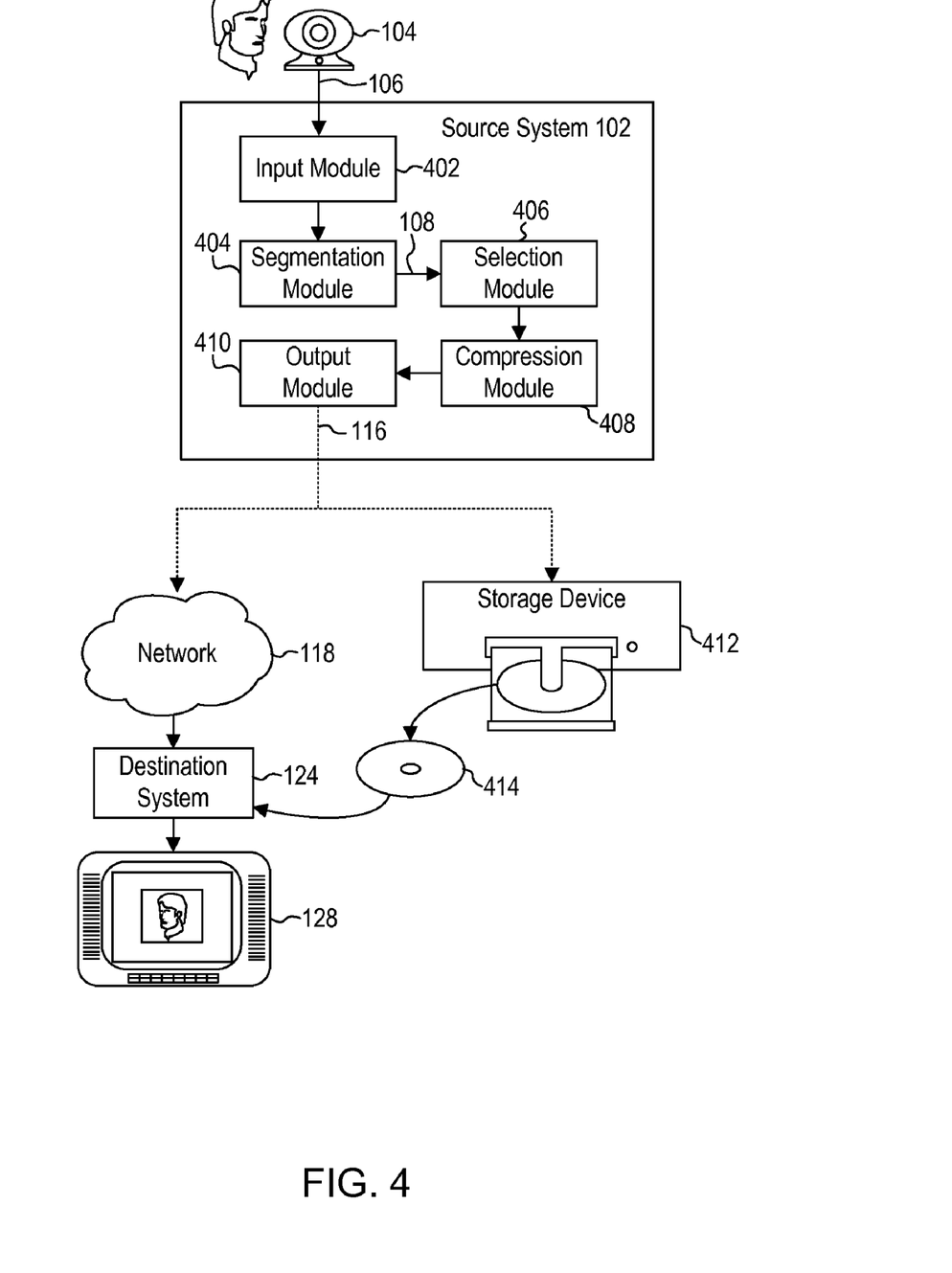
FIG. 4 is a block diagram of various functional modules of a source system.

FIG. 4 is a high-level overview of functional modules within the source system 102. Those of skill in the art will recognize that the functional modules may be implemented using any suitable combination of hardware and/or software. Furthermore, various functional modules may be combined, or the functionality of a single module may be divided between two or more modules within the scope of the invention.

An input module 402 may provide an interface for receiving the input signal 106 from the camera 104. A segmentation module 404 may divide the input signal 106 into a plurality of segments 108, as described with reference to FIG. 1.

A selection module 406 may automatically select one or more quality settings 112 for each segment 108, which are then used by a compression module 408 to compress the segments 108. An output module 410 delivers an output signal 116 including the compressed segments 108 to the destination system 124.

As illustrated, the delivery of the output signal 116 may be accomplished in different ways. In one embodiment, the output signal 116 may be transmitted to the destination system 124 via the network 118. Alternatively, the output signal 116 may be stored by a storage device 412 onto media 414, such as a recordable DVD or CD. In such an embodiment, the media 414 would be physically delivered to a destination system 124 that includes a media reader (not shown), such as a DVD-ROM or CD-ROM drive.

Figure 5:
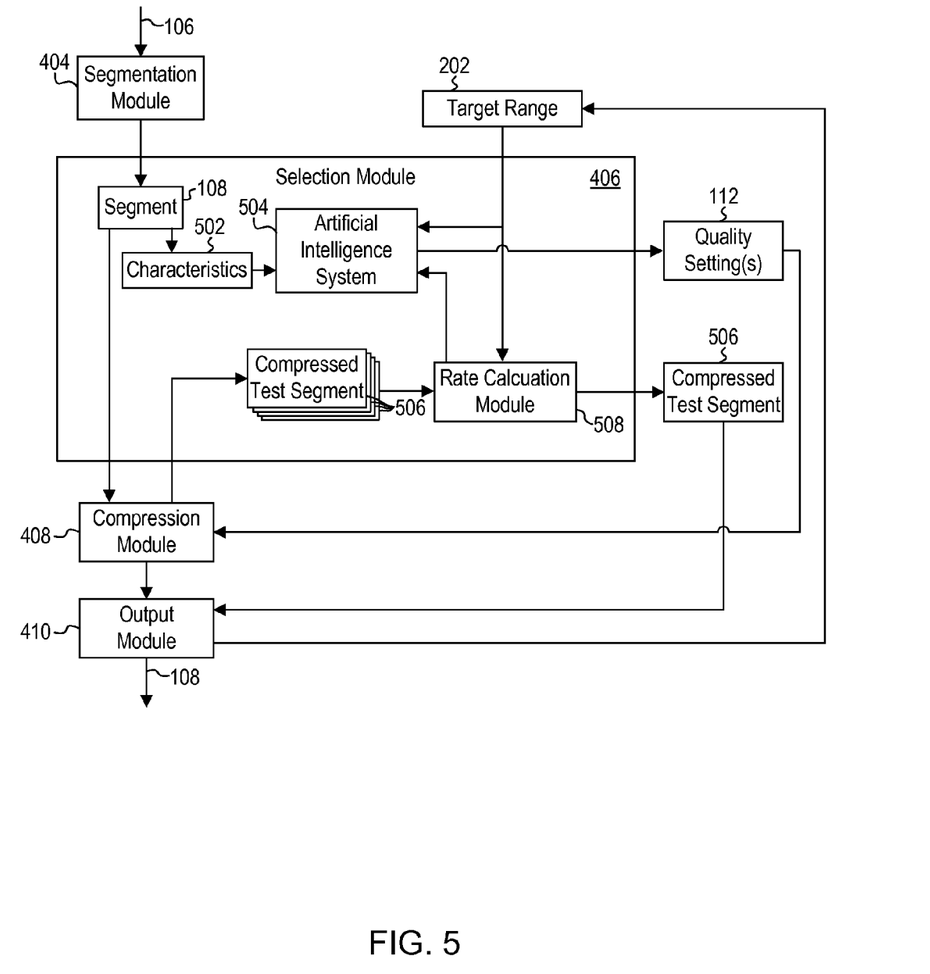
FIG. 5 is a detailed block diagram of a selection module.

FIG. 5 illustrates additional details of the selection module 406 according to one implementation of the invention. The segmentation module 404, in addition to dividing the input signal 106 into a plurality of segments 108, may also identify one or more characteristics 502 of each segment 108. The characteristics 502 may include, for instance, motion characteristics, color characteristics, YUV signal characteristics, color grouping characteristics, color dithering characteristics, color shifting characteristics, lighting characteristics, and contrast characteristics. Those of skill in the art will recognize that a wide variety of other characteristics of a segment 108 may be identified within the scope of the invention.

Motion is composed of vectors resulting from object detection. Relevant motion characteristics may include, for example, the number of objects, the size of the objects, the speed of the objects, and the direction of motion of the objects.

With respect to color, each pixel typically has a range of values for red, green, blue, and intensity. Relevant color characteristics may include how the ranges of values change through the frame set, whether some colors occur more frequently than other colors (selection), whether some color groupings shift within the frame set, whether differences between one grouping and another vary greatly across the frame set (contrast).

In one embodiment, an artificial intelligence (AI) system 504, such as a neural network or expert system, receives the characteristics 502 of the segment 108, as well as a target range 202 (or rate 114) for the output signal 116. The AI system 504 then determines whether one or more quality settings 112 have been previously found to optimally compress a segment 108 with the same characteristics 502. As explained below, the AI system 504 may be conceptualized as "storing" associations between sets of characteristics 502 and optimal quality settings 112. If an association is found, the selection module 406 may simply output the quality setting(s) 112 to the compression module 408 without the need for testing.

In many cases, however, a segment 108 having the given characteristics 502 may not have been previously encountered. Accordingly, the selection module 406 uses the compression module 408 to test different quality settings 112 on the segment 108, as described above in connection with FIGS. 1-3.

In one embodiment, the compression module 408 produces a compressed test segment 506 for each automatically-selected quality setting 112. A rate calculation module 508 then determines the calculated data rate 120 for the output signal 116 that would result from adding the respective compressed test segments 506.

When a quality setting 112 is found that results in a calculated rate 120 that is within the target range 202, the corresponding compressed test segment 506 is sent to the output module 410. The rate calculation module 508 may also notify the artificial intelligence system 504 so that a record can be made of the selected quality setting 112 for a segment 108 of the given characteristics 502.

As further illustrated in FIG. 5, the target range 202 (or rate 114) may be dynamically modified under certain conditions. For example, a buffer within the output module 410 may indicate that network difficulties have reduced the amount of available bandwidth. In such a case, the output module 410 may temporarily or permanently reduce the target range 202 (or rate 114).

In other embodiments, a user of the source system 102 may initially request a particular target range 202 (or rate 114). However, the destination system 124, upon receiving a connection request, may indicate that it cannot support the requested target range 202 (or rate 114). For instance, the destination system 124 may be a video-enabled cellular telephone, with limited bandwidth and display capabilities. Accordingly, the destination system 124 may signal the source system 102 to request that the target range 202 be modified before the communication session begins.

Figure 6:
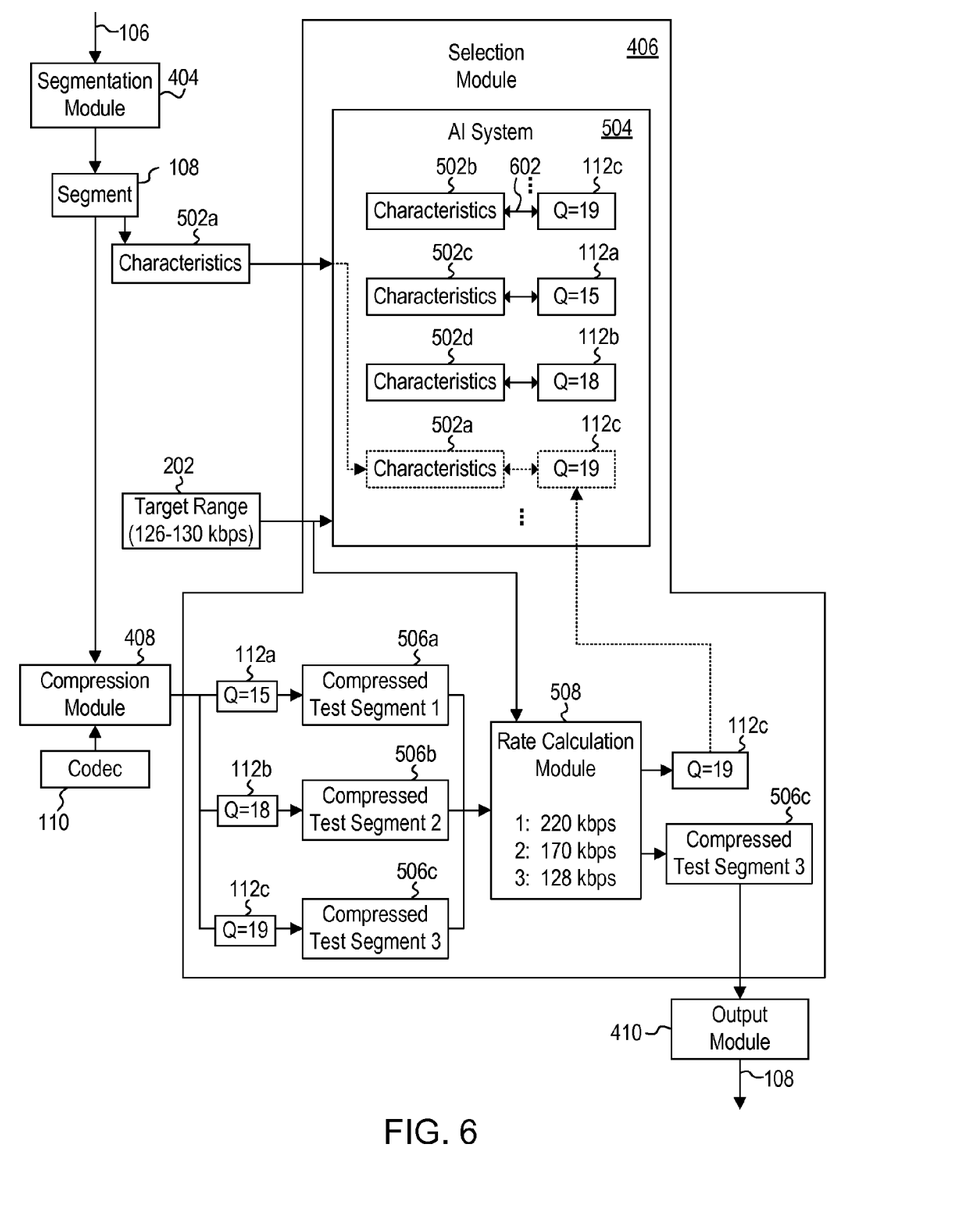
FIG. 6 is a data flow diagram of a process for selecting quality settings for a particular segment.

FIG. 6 provides an example of the process described in FIG. 5. Suppose that the segmentation module 404 identifies a segment 108 having a particular set of characteristics 502a, e.g., color characteristics, motion characteristics, etc. In one embodiment, the AI system 504 searches for an association 602 between the identified characteristics 502a and one or more quality settings 112, such as a quality quantizer.

Assuming that no such association 602 is found, the compression module 408 compresses the segment 108 using a codec 110 with an initial quality setting 112a (e.g., Q=15) to produce a first compressed test segment 506a. The rate calculation module 508 determines that the compressed test segment 506a, if added to the output signal 116, would result in a data rate of 220 kbps, which is 90 kbps higher than the target range 202 of 126-130 kbps.

Applying the selection function 302 of FIG. 3, the compression module next compresses the segment 108 using a new quality setting 112b (e.g., Q=18) to produce a second compressed test segment 506b. The rate calculation module 508 then determines that the second compressed test segment 506b, if added to the output signal 116, would result in a data rate of 170 kbps, which is still 40 kbps higher than the target range 202.

Consulting the selection function 302 again, the compression module finally compresses the segment 108 using yet another quality setting 112c (e.g., Q=19) to produce a third compressed test segment 506c. The rate calculation module 508 determines that the latest quality setting 112c will produce a data rate (e.g., 128 kbps) for the output signal 116 that is within the target range 202.

Accordingly, the third compressed segment 506c is sent to the output module 410 to be included in the output signal 116. In addition, the latest quality setting 112c (e.g., Q=19) is sent to the AI system 504, where an association 602 is created between the quality setting 112c and the identified characteristics 502a of the segment 108. The process for creating the association 602 will vary depending on the particular type of AI system 504. Subsequently, if a segment 108 is found to have similar characteristics 502a, the selection module 406 may simply retrieve the corresponding settings 112 from the AI system 504, either to be used without testing or to serve as an initial quality setting 112 within the testing process.

Figure 7:
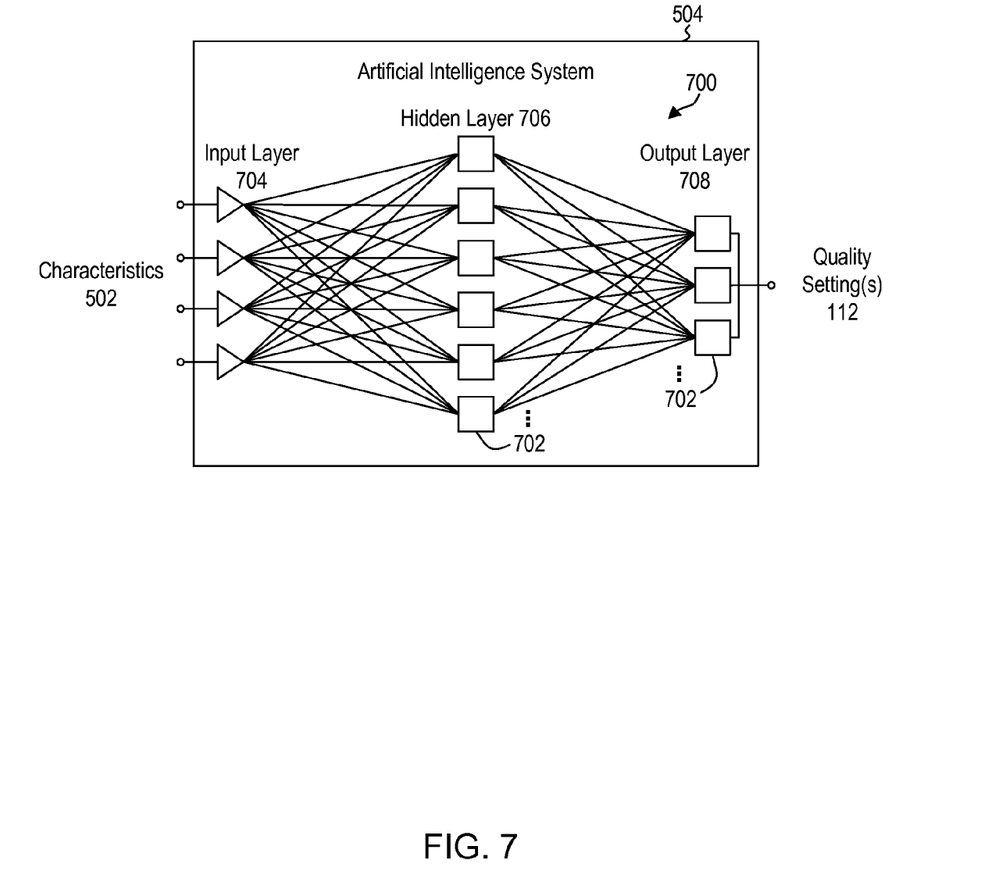
FIG. 7 is a block diagram of a neural network.

Referring to FIG. 7, the AI system 504 may be implemented using a typical feedforward neural network 700 comprising a plurality of artificial neurons 702. A neuron 702 receives a number of inputs (either from original data, or from the output of other neurons in the neural network 700). Each input comes via a connection that has a strength (or "weight"); these weights correspond to synaptic efficacy in a biological neuron. Each neuron 702 also has a single threshold value. The weighted sum of the inputs is formed, and the threshold subtracted, to compose the "activation" of the neuron 702 (also known as the post-synaptic potential, or PSP, of the neuron 702). The activation signal is passed through an activation function (also known as a transfer function) to produce the output of the neuron 702.

As illustrated, a typical neural network 700 has neurons 702 arranged in a distinct layered topology. The "input" layer 704 is not composed of neurons 702, per se. These units simply serve to introduce the values of the input variables (i.e., the scene characteristics 502). Neurons 702 in the hidden 706 and output 708 layers are each connected to all of the units in the preceding layer.

When the network 700 is executed, the input variable values are placed in the input units, and then the hidden and output layer units are progressively executed. Each of them calculates its activation value by taking the weighted sum of the outputs of the units in the preceding layer, and subtracting the threshold. The activation value is passed through the activation function to produce the output of the neuron 702. When the entire neural network 700 has been executed, the outputs of the output layer 708 act as the output of the entire network 700 (i.e., the automatically-selected quality settings 112).

While a feedforward neural network 700 is depicted in FIG. 7, those of skill in the art will recognize that other types of neural networks 700 may be used, such as feedback networks, Back-Propagated Delta Rule Networks (BP) and Radial Basis Function Networks (RBF). In other embodiments, an entirely different type of AI system 504 may be used, such as an expert system.

In still other embodiments, the AI system 504 may be replaced by lookup tables, databases, or other data structures that are capable of searching for quality settings 112 based on a specified set of characteristics 502. Thus, the invention should not be construed as requiring an AI system 504.

Figure 8:
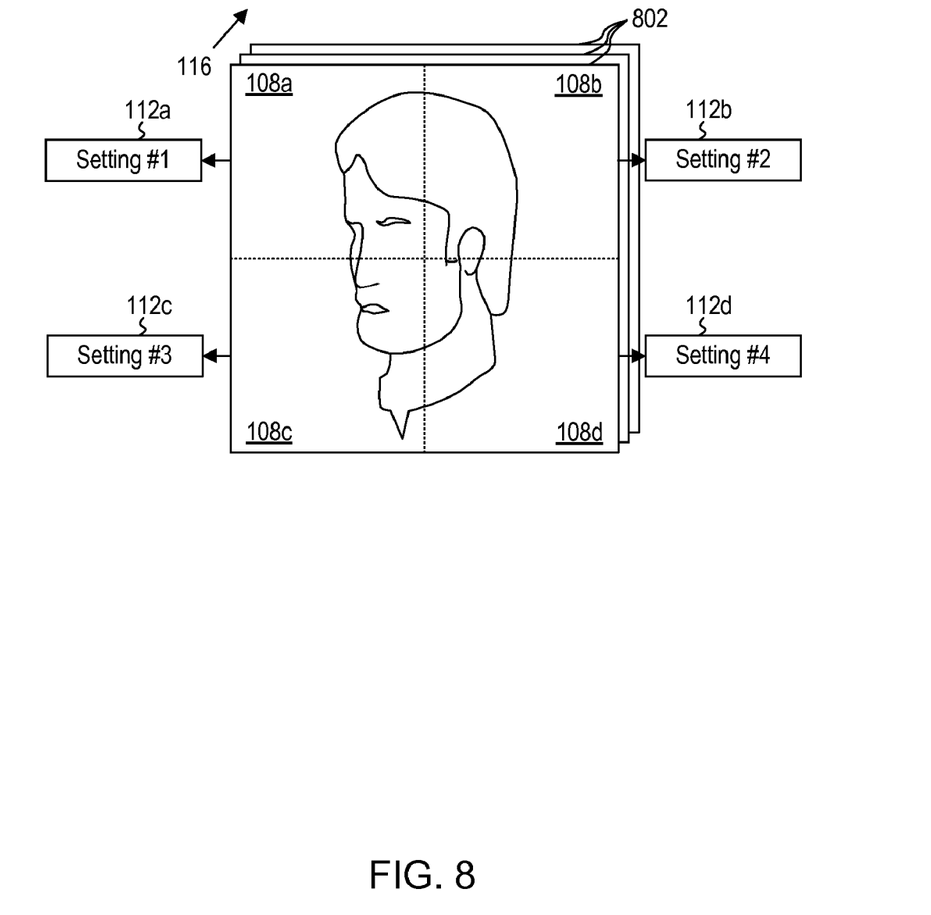
FIG. 8 is a block diagram of an alternative embodiment of the invention in which segments correspond to sub-frames.

As illustrated in FIG. 8, a segment 108 need not comprise an entire frame 802 (or multiple frames 802) of an input signal 106. Instead, segments 108 may correspond to subdivisions of a frame 802, referred to herein as "sub-frames." For instance, in the depicted embodiment, each frame 802 is subdivided into four segments 108*a-d*. Those of skill in the art, however, will recognize that a frame 802 may be subdivided in various other ways without departing from the spirit and scope of the invention.

Accordingly, each segment 108 of a frame 802 may be independently compressed using separate quality settings 112. For instance, a first segment 108*a* (sub-frame) may be compressed using a first quality setting 112*a*, while a second segment 108*b* is compressed using a second quality setting 112*b*.

In certain embodiments, the segments 108 may be defined by objects represented within the video frame 802. As an example, the head of a person could be defined as a separate object and, hence, a different segment 108 from the background. Algorithms (e.g., MPEG-4) for objectifying a scene within a video frame 802 are known in the art.

Figure 9:
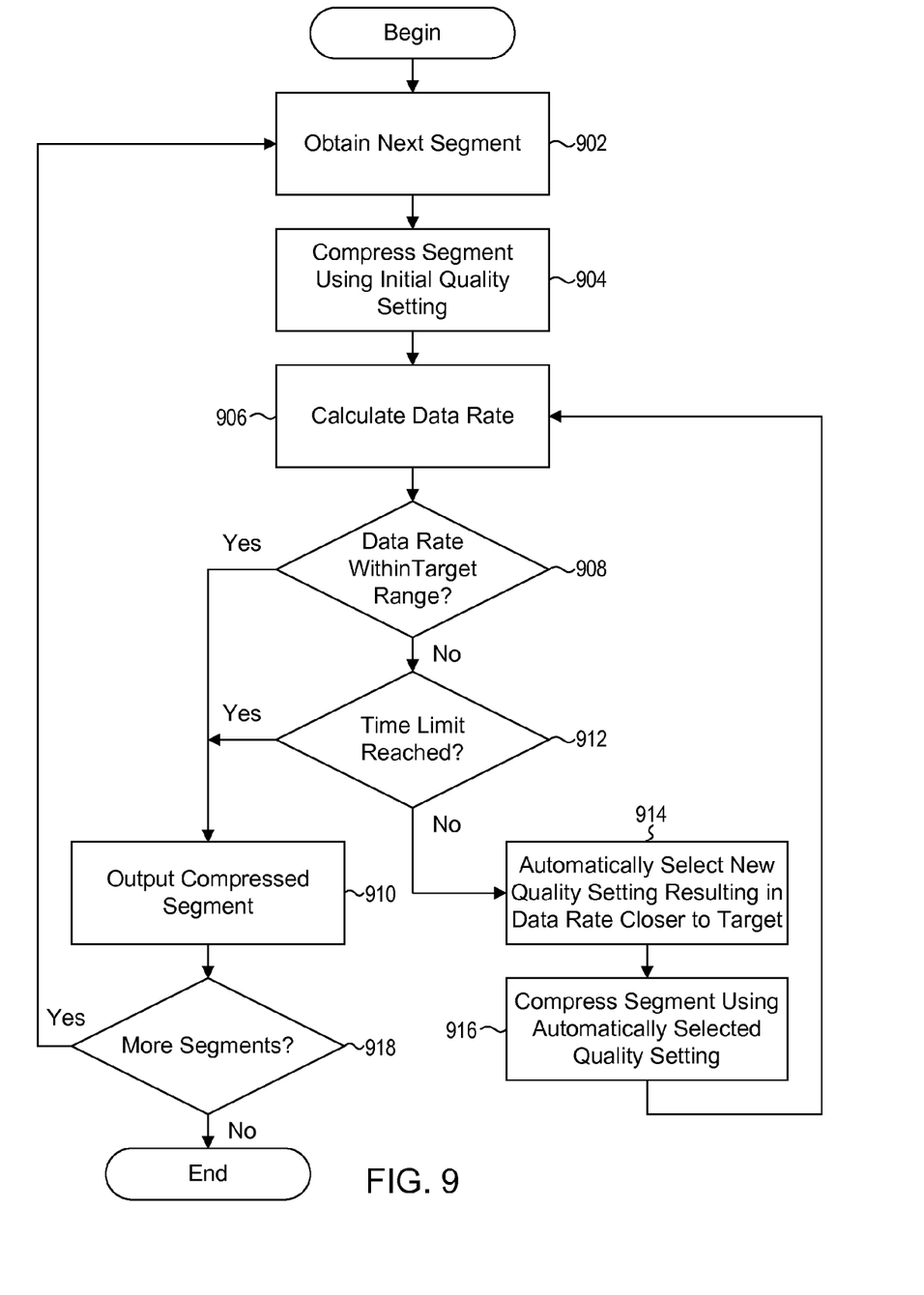
FIG. 9 is a flowchart of a method for video compression.

FIG. 9 is a flowchart of a video compression method that may be performed by a system of the type depicted in FIG. 5. Initially, the system obtains 902 the next segment 108 to be processed. Thereafter, the system compresses 904 the segment 108 using an initial quality setting 112. The initial quality setting 112 may be fixed or variable (i.e., based on the selected quality setting 112 for a previous segment 108).

The system then calculates 906 a data rate 120 that would result from adding the compressed segment 108 to an output data signal 116. A determination 908 is then made whether the calculated data rate 120 is within a target range 202. If so, the system simply outputs 910 the compressed segment 108.

If, however, the calculated data rate 120 is not within the target range, the system determines 912 whether a time limit for testing quality settings 112 for the particular segment 108 has been reached. If so, the system continues with step 910. Otherwise, the system automatically selects 914 a new quality setting 112 that results in a calculated data rate 120 that is closer to the target range 202. The system then compresses 916 the segment 108 using the automatically-selected quality setting 112, after which the system again calculates 906 the data rate. The system continues to automatically select 914 new quality settings 112 and compress 916 the segment 108 until either the calculated data rate 120 is within the target range 202 or the time limit has been reached.

After the compressed segment 108 has been output in step 910, a determination 918 is then made whether more segments 108 remain to be processed. If so, the system obtains 902 the next segment 108. Otherwise, the method ends.

In still other embodiments of the invention, the source system 102 may dynamically switch between different codecs 110, in addition to or in lieu of different quality settings 112, to maintain a target data rate 114. The source system 102 may also use video quality, based on such criteria as a peak signal to noise ratio (PSNR), to select an optimal codec 110 for compressing each particular segment 108. The codecs 110 may be stored in a codec library (not shown), and may include various available codecs 110, such as discrete cosine transform (DCT), fractal, and wavelet codecs 110.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A video compression method comprising:
    using at least one computer to perform the steps of:
        compressing a segment of an input signal at least two times using at least two different automatically selected quality settings to produce at least two compressed segments;
        automatically selecting the compressed segment with the highest quality setting, such that, when the selected compressed segment is added to an output signal, the output signal will not exceed a target data rate; and
        adding the selected compressed segment to the output signal.

2. The method of claim 1, wherein the automatically-selected quality setting comprises a quality quantizer.

3. The method of claim 1, wherein the automatically-selected quality setting comprises at least one of a frame size and a frame rate.

4. The method of claim 1, wherein the segment comprises a sub-frame.

5. A video compression system comprising:
    a compression module configured to compress a segment of an input signal at least two times using at least two different automatically selected quality settings to produce at least two compressed segments; and
    a selection module configured to automatically select the compressed segment with the highest quality setting, such that, when the selected compressed segment is added to an output signal, the output signal will not exceed a target data rate; and
    an output module configured to add the selected compressed segment to the output signal.

6. The system of claim 5, wherein the automatically-selected quality setting comprises a quality quantizer.

7. The system of claim 5, wherein the automatically-selected quality setting comprises at least one of a frame size and a frame rate.

8. The system of claim 5, wherein the segment comprises a sub-frame.

9. A non-transitory computer-readable storage medium comprising program instructions for causing a computer to perform a method comprising:
    compressing a segment of an input signal at least two times using at least two different automatically selected quality settings to produce at least two compressed segments;
    automatically selecting the compressed segment with the highest quality setting, such that, when the selected compressed segment is added to an output signal, the output signal will not exceed a target data rate; and
    adding the selected compressed segment to the output signal.

10. A video compression system comprising:

means for compressing a segment of an input signal at least two times using at least two different automatically selected quality settings to produce at least two compressed segments;

means for automatically selecting the compressed segment with the highest quality setting, such that, when the selected compressed segment is added to an output signal, the output signal will not exceed a target data rate; and means for adding the selected compressed segment to the output signal.

* * * * *